(12) United States Patent
Otto et al.

(10) Patent No.: US 12,279,551 B2
(45) Date of Patent: Apr. 22, 2025

(54) CUTTING ASSEMBLY FOR AN AGRICULTURAL OR FORESTRY CUTTER

(71) Applicant: SMF - HOLDING GMBH, Eichelhardt (DE)

(72) Inventors: Sascha Otto, Racksen (DE); Ralf Schmidt, Morsbach (DE)

(73) Assignee: SMF—HOLDING GMBH, Eichelhardt (DE)

( * ) Notice: Subject to any disclaimer, the term of this patent is extended or adjusted under 35 U.S.C. 154(b) by 721 days.

(21) Appl. No.: 17/595,865

(22) PCT Filed: May 27, 2020

(86) PCT No.: PCT/EP2020/064776
§ 371 (c)(1),
(2) Date: Nov. 29, 2021

(87) PCT Pub. No.: WO2020/239879
PCT Pub. Date: Dec. 3, 2020

(65) Prior Publication Data
US 2022/0312671 A1   Oct. 6, 2022

(30) Foreign Application Priority Data

May 28, 2019   (EP) .................................. 19177104

(51) Int. Cl.
*A01D 34/13* (2006.01)
*A01D 34/14* (2006.01)
*A01D 34/18* (2006.01)

(52) U.S. Cl.
CPC ............. *A01D 34/18* (2013.01); *A01D 34/14* (2013.01)

(58) Field of Classification Search
CPC ...... A01D 34/18; A01D 34/14; A01D 34/145; A01D 34/04; A01D 34/20; A01D 34/22; A01D 34/24
See application file for complete search history.

(56) References Cited

U.S. PATENT DOCUMENTS

| 195,907 A | 10/1877 | Thomson |
| 1,945,301 A | 1/1934 | Ira |

(Continued)

FOREIGN PATENT DOCUMENTS

| CA | 2698856 A1 | 10/2010 |
| DE | 32 29 743 A1 | 2/1984 |

(Continued)

OTHER PUBLICATIONS

International Search Report for PCT/EP2020/064776 dated Sep. 14, 2020 [PCT/ISA/210].

*Primary Examiner* — Adam J Behrens
*Assistant Examiner* — Robert E Pezzuto
(74) *Attorney, Agent, or Firm* — Sughrue Mion, PLLC

(57) ABSTRACT

A cutting assembly for an agricultural or forestry cutter, the cutting assembly comprising a lower member and an upper member, which together form at least one finger guard extending along a longitudinal axis, wherein a blade gap is formed between the lower member and the upper member, and a knife, which is guided in a reciprocating manner in the blade gap in a drive direction transverse to the longitudinal axis, and which has at least one cutting edge.

18 Claims, 4 Drawing Sheets

(56) References Cited

U.S. PATENT DOCUMENTS

| | | | | |
|---|---|---|---|---|
| 3,566,592 A | * | 3/1971 | Jerman et al. | A01D 34/20 56/311 |
| 4,519,192 A | * | 5/1985 | Oppenhuisen | A01D 34/18 56/308 |
| 5,209,053 A | * | 5/1993 | Verbeek | A01D 34/18 56/307 |
| 2002/0005035 A1 | | 1/2002 | Hovsepian | |

FOREIGN PATENT DOCUMENTS

| | | |
|---|---|---|
| EP | 2 366 274 A2 | 9/2011 |
| GB | 1176160 A | 1/1970 |
| JP | 56-18026 U | 7/1979 |
| JP | 55-88615 A | 7/1980 |
| JP | 60-133807 A | 7/1985 |

* cited by examiner

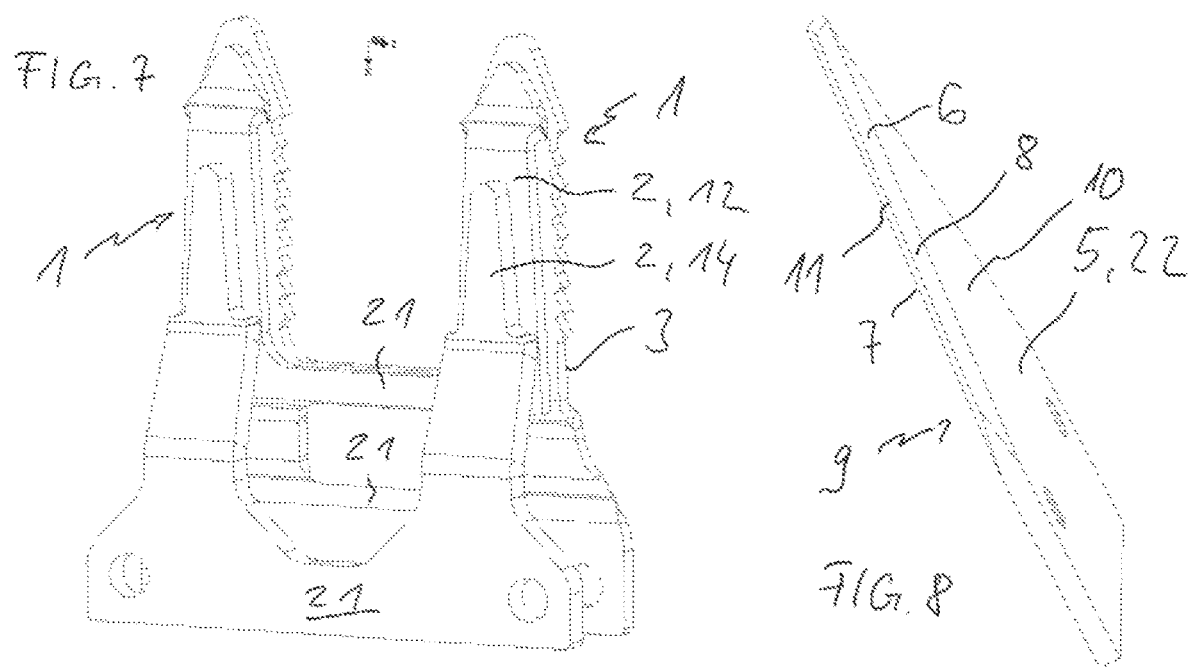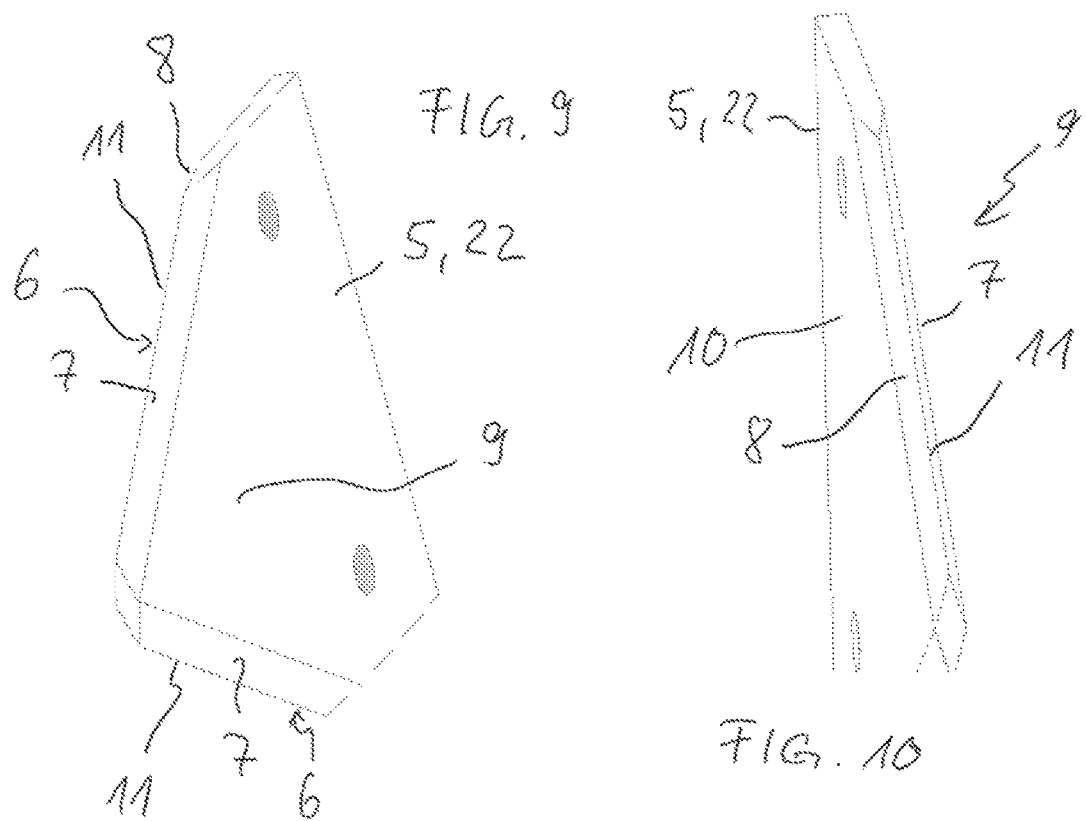

CUTTING ASSEMBLY FOR AN AGRICULTURAL OR FORESTRY CUTTER

CROSS REFERENCE TO RELATED APPLICATIONS

This application is a National Stage of International Application No. PCT/EP2020/064776, filed May 27, 2020, claiming priority to European Patent Application No. 19177104.7, filed May 28, 2019.

FIELD

The present disclosure relates to a cutting assembly for an agricultural or forestry cutter, the cutting assembly comprising: a lower member and an upper member, which together form at least one finger guard extending along a longitudinal axis, wherein a blade gap is formed between the lower member and the upper member, a knife which is guided in a reciprocating manner in the blade gap in a drive direction transverse to the longitudinal axis, and which has at least one cutting edge.

BACKGROUND

Cutting assemblies are known, for example, in mower units, which generally have a finger bar on which a plurality of finger guards are arranged. A knife is guided in an oscillating manner relative to the finger bar, wherein the knife comprises a knife bar to which a plurality of knife blades are attached. The knife blades form cutting edges that cooperate with mating cutting edges formed by the guard fingers. A corresponding mowing finger arrangement is described in EP 2 366 274 A2.

A disadvantage of the cutting assemblies provided for mowing or cutting crops, respectively, is that they are limited to cutting stalks.

An objective may be to provide a cutting assembly, which allows cutting of plant parts with higher thickness and/or hardness.

SUMMARY

The cutting assembly for an agricultural or forestry cutter comprises a lower member and an upper member, which together form at least one finger guard extending along a longitudinal axis, wherein a blade gap is formed between the lower member and the upper member, and a knife which is guided in a reciprocating manner in the blade gap in a drive direction transverse to the longitudinal axis and which has at least one cutting edge. According to an aspect, the cutting edge has a lower cutting bevel facing the lower member and an upper cutting bevel facing the upper member.

In contrast to the prior art, the cutting edge does not cooperate with a counter cutting edge at the blade gap. Thus, the cutting edge does not perform a scissor cut in cooperation with the finger guard. Instead, the finger guard here advantageously serves as a counterholder and the blade cuts through the material to be cut in the manner of a wedge cut or axe cut by means of the cutting edge with the lower cutting bevel and the upper cutting bevel. This makes it possible to cut through material of greater thickness and strength, such as branches. The lower cutting bevel and the upper cutting bevel may contact each other along a cutting edge line and may enclose an acute cutting edge angle.

The designations lower member and upper member do not refer to a specific orientation of the cutter with respect to a ground or a working machine, but define upper and lower only with respect to the cutter itself. The longitudinal axis of the finger guard extends in a Cartesian coordinate system with three spatial directions X, Y and Z in the X-direction, while the drive direction of the knife, in particular, is in the Z-direction. The lower member and the upper member are spaced apart in the Y-direction. The designations of members as upper and lower members are, in terms of the disclosure, arranged spaced apart along the Y-direction, wherein upper parts are arranged closer to the upper member than to the lower member, and wherein lower parts are arranged closer to the lower member than to the upper member.

When the cutter is used, it is provided that the lower member faces the portion of the material to be cut that remains on the plant after cutting. The portion of the material to be cut off is located on the side of the upper member during cutting.

According to an embodiment, it is provided that the blade has a lower contact surface facing the lower member, with respect to which the lower cutting bevel extends inclined, and that the blade has an upper contact surface facing the upper member, with respect to which the upper cutting bevel extends inclined. The lower contact surface and the upper contact surface are arranged parallel to each other, for example. The cutting edge, in a thickness direction of the blade, may be arranged between the lower contact surface and the upper contact surface.

According to a further embodiment, the lower member is provided in two parts, wherein a guide member and a support jointly form the lower member, and wherein the guide member is arranged at least partly between the support and the upper member. The guide member has a lower guide surface which delimits the knife gap and the upper member has an upper guide surface which likewise bounds the knife gap, wherein the lower guide surface and the upper guide surface are arranged parallel to one another.

According to a further embodiment, it is provided that the guide member has at least one lower abutment edge and the upper member has at least one upper abutment edge, past which the cutting edge is driven during the reciprocating movement of the knife. For example, the upper abutment edge is serrated and the lower abutment edge is formed straight. The guide member can have lower abutment edges on both sides of the longitudinal axis and the upper member can have upper abutment edges on both sides of the longitudinal axis.

According to a further embodiment, it is provided that the lower member and the upper member form two or more finger guards, wherein the fingers are arranged parallel to each other and are connected to each other via at least one web on the lower member and/or on the upper member.

BRIEF DESCRIPTION OF THE DRAWINGS

In the following, an exemplary embodiment is described with reference to the accompanying drawings, which show in FIG. 1 an exemplary embodiment of a cutting assembly in a side view;

FIG. 7 the two finger guards according to FIG. 5 in a further perspective view;

FIG. 8 a knife of the exemplary embodiment according to FIG. 1 in a perspective view;

FIG. 9 the knife according to FIG. 8 in a further perspective view;

FIG. 10 the knife according to FIG. 8 in a further perspective view.

DETAILED DESCRIPTION

Figure 1:
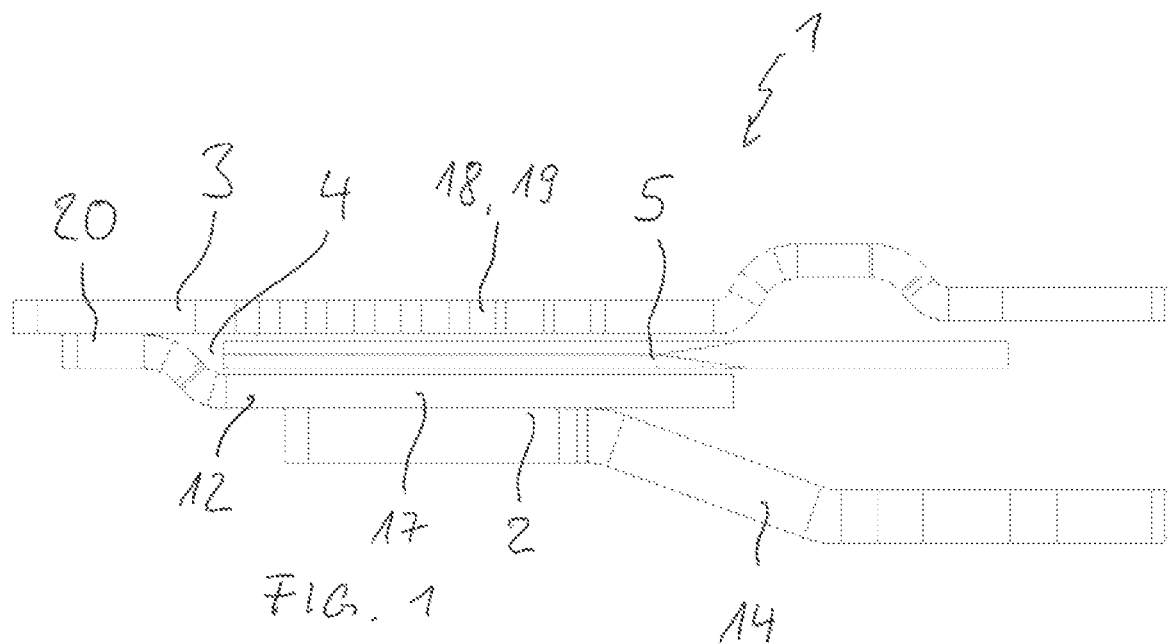
Figure 2:
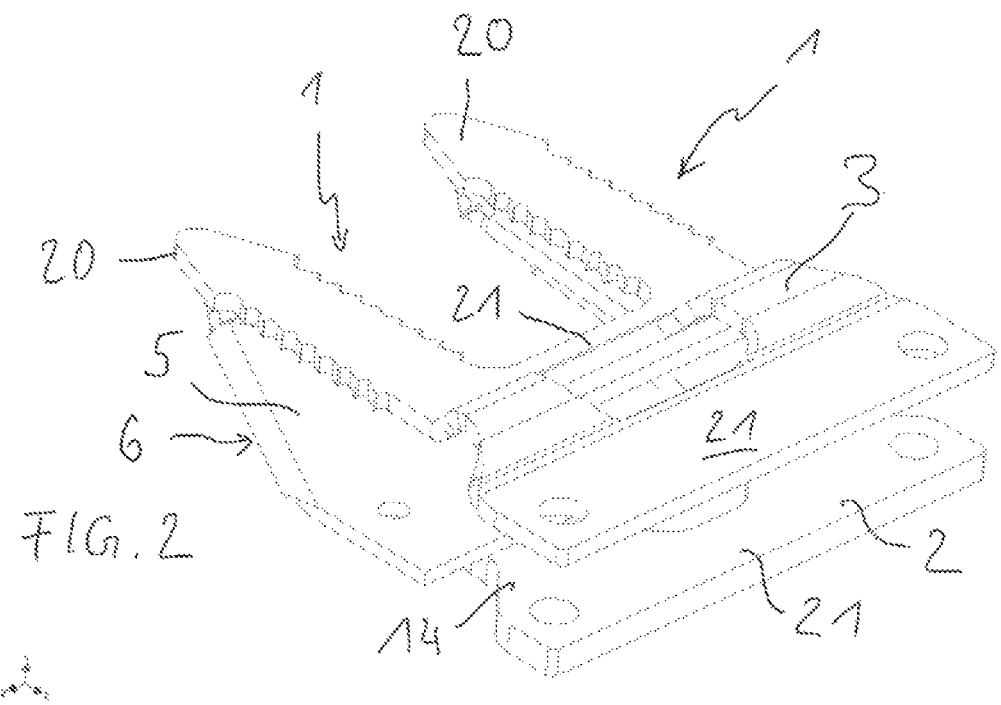
FIG. 2 shows the exemplary embodiment according to FIG. 1 in a perspective view.
Figure 3:
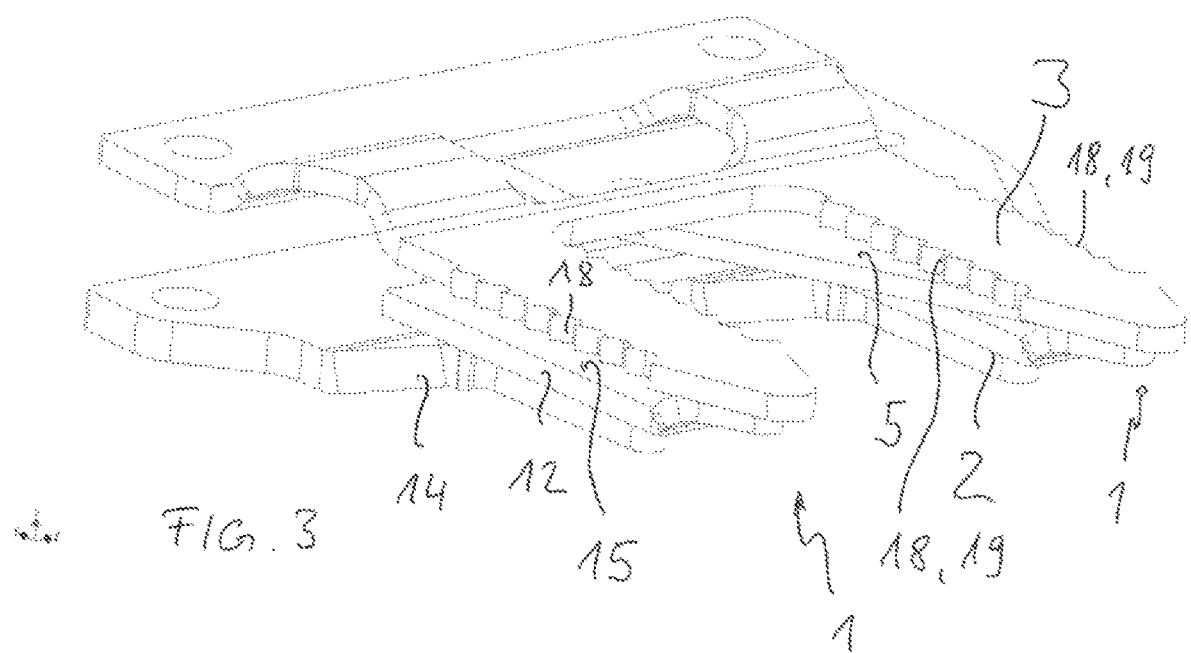
FIG. 3 shows the exemplary embodiment according to FIG. 1 in a further perspective view.
Figure 4:
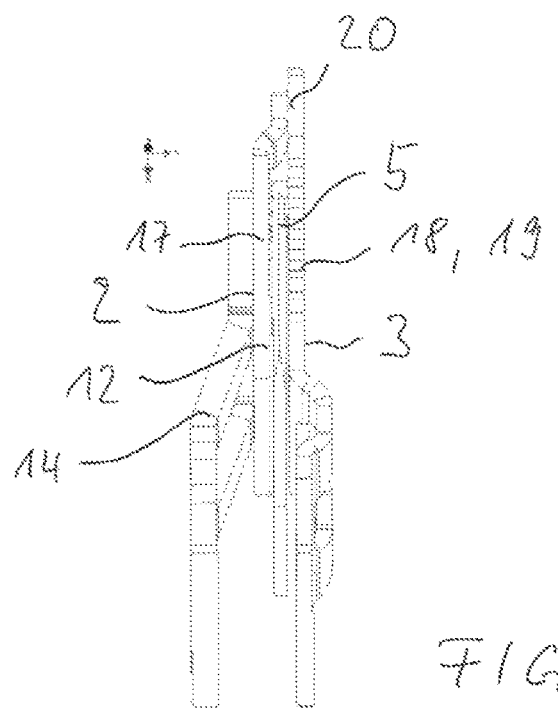
FIG. 4 the exemplary embodiment according to FIG. 1 in a further perspective view.

FIGS. 1 to 4 show an exemplary embodiment of a cutting assembly in a side view and in several perspective views, which are described together below. The cutting assembly for an agricultural or forestry cutter comprises a lower member 2 and an upper member 3, which together form at least one finger guard 1 extending along a longitudinal axis. In the exemplary embodiment shown, the lower member 2 and the upper member 3 form two finger guards 1, wherein the finger guards 1 are arranged parallel to each other and are connected to each other via at least one web 21 on the lower member 2 and/or on the upper member 3. This embodiment is also called a double finger guard. Here, two webs 21 are provided on the upper member 3 and one web 21 is provided on the lower member 2, as can be seen in FIG. 2. The lower member 2 and the upper member 3 are connected to each other at tips 20 of the finger guards 1. The skilled person is familiar with the arrangement of the finger guard 1 by means of fastening means on a finger bar which is not shown. The longitudinal axes of the two finger guards 1, which are not shown, extend parallel to one another in the X direction in a Cartesian coordinate system with three spatial directions X, Y and Z. The finger guards 1 are attached to the lower member 2 and the upper member 3 by fastening means.

A blade gap 4 is formed between the lower member 2 and the upper member 3. In the blade gap 4, a blade 5 is guided back and forth in a drive direction transverse to the longitudinal axis. The drive direction of the knife corresponds in particular to the Z-direction. The lower member 2 and the upper member 3 are spaced apart in the Y-direction. The Y-direction corresponds to a thickness direction Y of the knife 5. The knife 5 has at least one cutting edge 6, which is described in more detail below with reference to FIGS. 8 to 10.

In FIGS. 8 to 10, the knife 5 of the exemplary embodiment according to FIG. 1 is shown individually in several perspective views, which shall be described together. The cutting edge 6 has a lower cutting bevel 7 facing the lower member 2 and an upper cutting bevel 8 facing the upper member 3. The cutting edge 6 does not cooperate with any counter cutting edge on the blade gap 4. Thus, the cutting edge 6 does not perform a scissor cut in cooperation with the finger guard 1. Instead, the finger guard 1 serves as a counterholder and the knife cuts through the material to be cut in the manner of a wedge cut or axe cut by means of the cutting edge 6. Thus, material to be cut of higher thickness and strength can be cut through, for example branches.

The knife 5 comprises, for example, a plurality of knife blades 22, each of which has the at least one cutting edge 6, wherein only one knife blade 22 is shown here in each case. The skilled person is familiar with the arrangement of a plurality of knife blades 22 by means of fastening means to a knife bar, not shown, to form the knife 5. The knife blade 22 has, for example, two cutting edges 6 facing away from each other. The lower cutting bevel 7 and the upper cutting bevel 8 contact each other, for example, along a cutting edge line 11 and enclose, for example, an acute cutting edge angle. In the embodiment shown, the blade 5 has a lower contact surface 9 facing the lower member 2, to which the lower cutting bevel 7 extends inclined. An upper contact surface 10 of the knife 5 facing the upper member 3 extends inclined to the upper cutting bevel 8. The lower contact surface 9 and the upper contact surface 10 are arranged parallel to each other, for example. The cutting edge 6 is arranged in the thickness direction Y of the knife 5 between the lower contact surface 9 and the upper contact surface 10. The lower contact surface 9 and the upper contact surface 10 cooperate with the blade gap 4, which will be explained in more detail below with reference to FIGS. 5 to 7.

Figure 5:
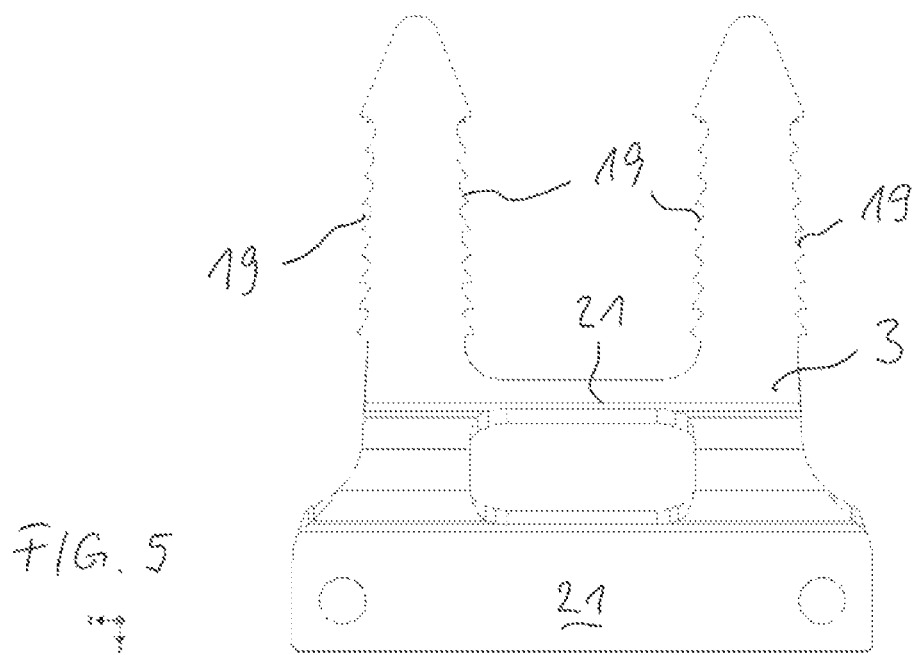
FIG. 5 two finger guards of the exemplary embodiment according to FIG. 1 in a side view.
Figure 6:
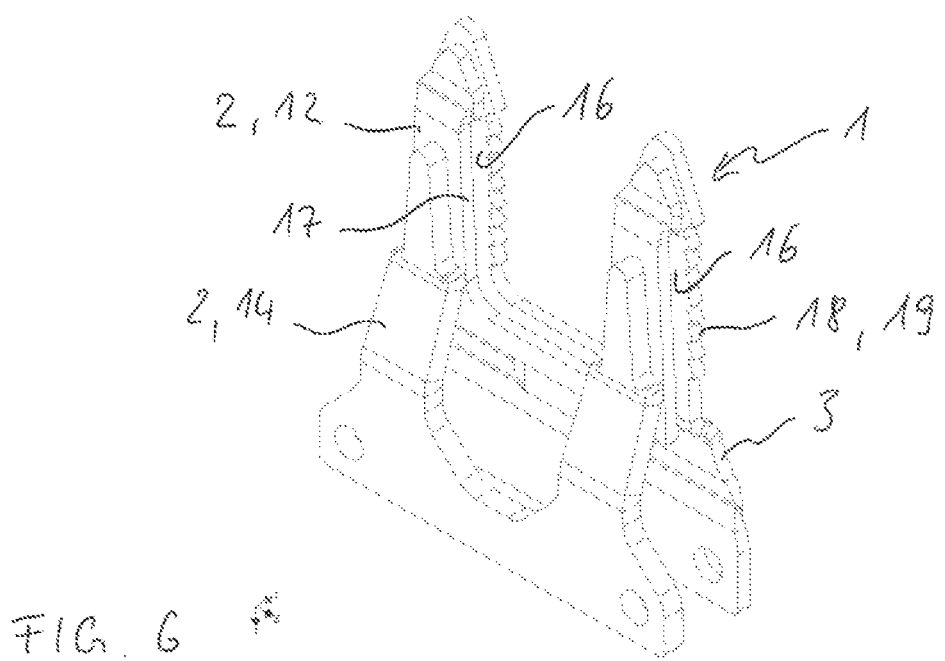
FIG. 6 the two finger guards according to FIG. 5 in a perspective view.

In FIGS. 5 to 7, the lower member 2 and the upper member 3 of the exemplary embodiment according to FIG. 1 are shown without the blade in a side view and in several perspective views, which are described together. In the embodiment shown, it is provided that the lower member 2 is made in two parts, wherein a guide member 12 and a support 14 jointly form the lower member 2. The guide part 12 is partly arranged between the support 14 and the upper member 3. The support 14 and the guide part 12 are, for example, firmly connected to one another. The guide part 12 has a lower guide surface 15, which delimits the blade gap 4 together with an upper guide surface 16 on the upper member 3. The lower guide surface 15 and the upper guide surface 16 are arranged parallel to each other. The guide part 12 has at least one lower abutment edge 17 and the upper member 3 has at least one upper abutment edge 18, past which the blade 6 is driven during the reciprocating movement of the blade 5. In the exemplary embodiment, the guide member 12 has four lower abutment edges 17, namely two per finger guard 1. The upper member 3 accordingly has four upper abutment edges 18. The upper abutment edges 18 have a serration 19, while the lower abutment edges 17 are formed straight. The serration 19 advantageously retains the material to be cut during cutting. When the cutter is used, it is provided that the lower member 2 faces the part of the material to be cut, which remains on the plant after cutting. The part of the material to be cut off is located on the side of the upper member 3 during cutting. Thus, the material to be cut is splintered by the teeth 19 only at the part where no special requirements apply to the cut. The part of the material to be cut remaining on the plant, on the other hand, is advantageously given a clean cut due to the straight-formed abutment edges 17, which prevents regrowth and/or penetration by fungi.

REFERENCE NUMERALS

1 Finger guard
 2 Lower member
 3 Upper member
 4 Blade gap
 5 Knife
 6 Cutting edge
 7 Lower cutting bevel
 8 Upper cutting bevel
 9 Lower contact surface
 10 Upper contact surface
 11 Cutting edge line
 12 Guide member
 14 Support
 15 Lower guide surface 16 Upper guide surface
17 Lower abutment edge
18 Upper abutment edge
19 serration
20 Tip
21 Web
22 Knife blade
X X-direction, longitudinal direction
Y Y-direction, thickness direction of knife blade
Z Z-direction, transverse direction

The invention claimed is:
1. A cutting assembly for an agricultural or forestry cutter, the cutting assembly comprising:
   a lower member and an upper member, which together form at least one finger guard extending along a longitudinal axis, wherein a blade gap is formed between the lower member and the upper member, and
   a knife, which is guided in a reciprocating manner in the blade gap in a drive direction transverse to the longitudinal axis, and which has at least one cutting edge,
   wherein the lower member is designed in two parts, wherein a guide member and a support together form the lower member, and wherein the guide member is arranged at least in sections between the support and the upper member,
   wherein a blade of the knife has a lower cutting bevel facing the lower member and an upper cutting bevel facing the upper member,
   wherein the guide member has at least one lower abutment edge and the upper member has at least one upper abutment edge, past which the blade is driven during the reciprocating movement of the knife, and
   wherein the upper abutment edge is serrated and the lower abutment edge is formed straight.
2. The cutting assembly according to claim 1,
   wherein the finger guard is a counterholder and the knife is configured to cut through material in a manner of a wedge cut or axe cut.
3. The cutting assembly according to claim 1,
   wherein the blade has a lower contact surface facing the lower member, to which the lower cutting bevel extends inclined, and in that the blade has an upper contact surface facing the upper member, to which the upper cutting bevel extends inclined.
4. The cutting assembly according to claim 3,
   wherein the lower contact surface and the upper contact surface are arranged parallel to each other.
5. The cutting assembly according to claim 1,
   wherein the lower cutting bevel and the upper cutting bevel contact each other along a cutting edge line and enclose an acute cutting edge angle.
6. The cutting assembly according to claim 5,
   wherein in a thickness direction of the blade the cutting edge line is arranged between the lower contact surface and the upper contact surface.
7. The cutting assembly according to claim 1,
   wherein the guide member has a lower guide surface delimiting the blade gap and that the upper member has an upper guide surface delimiting the blade gap, wherein the lower guide surface and the upper guide surface are arranged parallel to each other.
8. The cutting assembly according to claim 1,
   wherein at least part of the guide member is sandwiched between the support and the upper member.
9. The cutting assembly according to claim 1,
   wherein the guide member and the support are two distinct parts that are connected to form the lower member.
10. The cutting assembly according to claim 1,
    wherein the guide member has lower abutment edges on both sides of the longitudinal axis and the upper member has upper abutment edges on both sides of the longitudinal axis.
11. The cutting assembly according to claim 1,
    wherein the lower member and the upper member are connected to each other at a tip.
12. The cutting assembly according to claim 1,
    wherein the lower member and the upper member form two or more finger guards, wherein the finger guards are arranged parallel to each other and are connected to each other via at least one web on the lower member and/or on the upper member.
13. The cutting assembly according to claim 1,
    wherein the knife comprises knife blades comprising the at least one cutting edge.
14. The cutting assembly according to claim 13,
    wherein the knife blade comprises two cutting edges facing away from each other.
15. A finger guard of a cutting assembly for an agricultural or forestry cutter, the finger guard comprising:
    a lower member and an upper member, which together form the finger guard extending along a longitudinal axis, wherein a blade gap is formed between the lower member and the upper member in such a way that a knife is guided reciprocatingly in the blade gap in a drive direction transverse to the longitudinal axis,
    wherein the lower member is made in two parts, wherein a guide member and a support together form the lower member, and wherein the guide member is arranged at least in sections between the support and the upper member,
    wherein the guide member has at least one lower abutment edge and the upper member has at least one upper abutment edge past which a blade of the knife is driven during the reciprocating movement of the knife, and
    wherein the upper abutment edge is serrated and the lower abutment edge is formed straight.
16. The finger guard according to claim 15,
    wherein the guide member has a lower guide surface which delimits the blade gap and that the upper member has an upper guide surface which delimits the blade gap, wherein the lower guide surface and the upper guide surface are arranged parallel to one another.
17. The finger guard according to claim 15,
    wherein the guide member has lower abutment edges on both sides of the longitudinal axis and the upper member has upper abutment edges on both sides of the longitudinal axis.
18. A cutting assembly for an agricultural or forestry cutter, the cutting assembly comprising:
    a lower member and an upper member forming two or more finger guards, wherein the finger guards are arranged parallel to each other, extending in a longitudinal direction, and are connected to each other via at least one web on at least one of the lower member and or the upper member, wherein a blade gap is formed between the lower member and the upper member, and
    a knife, which is guided in a reciprocating manner in the blade gap in a drive direction transverse to the longitudinal axis, and which has at least cutting edge, wherein the lower member is designed in two parts, wherein a guide member and a support together form the lower member, and wherein the guide member is arranged at least in sections between the support and the upper member, wherein a blade of the knife has a lower cutting bevel facing the lower member and an upper cutting bevel facing the upper member, wherein the guide member has at least one lower abutment edge and the upper member has at least one upper abutment edge, past which the blade is driven during the reciprocating movement of the knife, and wherein the upper abutment edge is serrated and the lower abutment edge is formed straight.

* * * * *